(12) United States Patent
Mowery et al.

(10) Patent No.: US 6,898,766 B2
(45) Date of Patent: May 24, 2005

(54) SIMPLIFYING INTEGRATED CIRCUITS WITH A COMMON COMMUNICATIONS BUS

(75) Inventors: Keith R. Mowery, Plano, TX (US); Willam F. Harris, Dallas, TX (US); Daniel G. Jensen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 24 days.

(21) Appl. No.: 10/261,966

(22) Filed: Oct. 1, 2002

(65) Prior Publication Data

US 2003/0081391 A1 May 1, 2003

Related U.S. Application Data

(60) Provisional application No. 60/335,693, filed on Oct. 30, 2001.

(51) Int. Cl.$^7$ .............................................. G06F 17/50
(52) U.S. Cl. ........................... 716/1; 710/100; 710/113; 710/114; 710/115
(58) Field of Search .......................... 716/1; 710/8, 20, 710/62, 63–65, 100, 105, 305, 313–315; 713/320; 712/32

(56) References Cited

U.S. PATENT DOCUMENTS

| | | | |
|---|---|---|---|
| 5,537,607 A | * | 7/1996 | Ploger, III .................... 710/10 |
| 6,526,462 B1 | * | 2/2003 | Elabd ......................... 710/242 |
| 2002/0002645 A1 | * | 1/2002 | Hatano ........................ 710/100 |
| 2002/0040443 A1 | * | 4/2002 | Maeda et al. ................ 713/320 |
| 2002/0073334 A1 | * | 6/2002 | Sherman et al. ............. 713/201 |
| 2002/0133646 A1 | * | 9/2002 | Cheung et al. ................ 710/22 |
| 2003/0042554 A1 | * | 3/2003 | Honmura ..................... 257/393 |
| 2003/0120896 A1 | * | 6/2003 | Gosior et al. .................. 712/32 |
| 2004/0010652 A1 | * | 1/2004 | Adams et al. ............... 710/313 |

* cited by examiner

*Primary Examiner*—Vuthe Siek
(74) *Attorney, Agent, or Firm*—William B. Kempler; W. James Brady, III; Frederick J. Telecky, Jr.

(57) ABSTRACT

When integrating a peripheral, it is common practice to use a fully custom design. Custom designs typically optimize performance, size, and energy usage. However, custom designs are more expensive in terms of testing and development time. Rather than designing an integrated peripheral, an existing design (for example, peripheral 420) for the peripheral with attendant communications bus interface (for example, interface 424) is combined with an existing communications bus interface (for example, peripheral bus interface 410) to produce an integrated circuit (for example, integrated circuit 405). The use of existing designs greatly reduces development and test time, along with costs.

21 Claims, 4 Drawing Sheets

SIMPLIFYING INTEGRATED CIRCUITS WITH A COMMON COMMUNICATIONS BUS

This application claims priority to a provisional application entitled "Wireless PCI Single Chip Solution," Ser. No. 60/335,693, filed Oct. 30, 2001. The provisional application is incorporated herein by reference.

FIELD OF THE INVENTION

This invention relates generally to digital circuits and particularly to simplifying the integration of peripherals and devices into an integrated circuit through the use of a common internal communications bus.

BACKGROUND OF THE INVENTION

One of the great benefits of a computer is its ability to accept the attachment of additional circuits and/or devices. The ability to attach additional devices can greatly increase the flexibility and usability of the computer. These additional circuits and/or devices are commonly referred to as peripherals. Peripherals can be used to provide functionality that was not available on the computer or enhance existing functionality.

However, if these peripherals communicate using a different signaling format or scheme (commonly referred to as signaling protocols), then it is necessary to use an interface to perform the needed translation between the different signaling protocols used by the peripheral and the computer. For example, a commonly used communications bus, referred to as a Universal Serial Bus (USB), has become a popular way to connect peripherals to a computer. However, the majority of computers use a different communications bus, a Peripheral Component Interconnect (PCI) bus, to communicate with peripherals that are inside the computer's housing. Therefore, there is a need for an interface between the USB and PCI busses in order for peripherals connected on the USB to communicate to the computer.

An example of a peripheral that is commonly connected to the computer via the USB is a network adapter (both wired and wireless). The attachment of the network adapter allows the computer to connect to a computer (or communications) network and share files, information, multimedia, etc. Of course, the computer network uses its own signaling protocol and an interface is needed there as well. The network adapter provides such an interface, translating the computer network's signaling protocol into the USB signaling protocol, which is then provided to the computer. The network adapter also converts the USB signaling protocol into the computer networks signaling protocol.

As the integration of digital circuits increase, the natural progression for computer devices and peripherals is to integrate as many commonly used devices and peripherals into the computer as is possible. For example, the networked computer has become ubiquitous and many computers have an integrated network adapter. However, in many cases, these integrated network adapters are not truly integrated circuits and are simply existing network adapters that are placed onto the computer's motherboard and are made up of a plurality of discrete parts and/or integrated circuits. To maximize integration, the network adapters are fabricated onto a single semiconductor substrate and placed into a package. Some designers of fully integrated network adapters have taken the custom circuit design path and using fully customized circuitry to perform the necessary operations and interfacing. While this results in a fully functional integrated network adapter, the design of custom circuitry can involve significant expenditures in terms of dollars and engineering time for the development, testing, and debugging of the integrated circuit.

A need has therefore arisen for a method to facilitate the integration of devices and interfaces into an integrated circuit that minimizes the expenditure of design and engineering time as well as money.

SUMMARY OF THE INVENTION

In one aspect, the present invention provides a method for integrating a peripheral into an integrated circuit comprising the steps of selecting a first existing design for the peripheral with a first interface to a first communications bus and the first communications bus, selecting a second existing design with a second communications bus with a second interface to a computer communications bus, coupling the first and second existing designs together, and integrating the first and second existing designs into the integrated circuit In another aspect, the present invention provides an integrated circuit comprising a first pre-existing design comprising a peripheral, a first interface coupled to the peripheral, the first interface containing circuitry to translate signals produced by the peripheral in a first protocol into a second protocol, the integrated circuit further comprising a first communications bus coupled to the first pre-existing design, the first communications bus to carry signals to and from the first pre-existing design, a second pre-existing design coupled to the first communications bus, the second pre-existing design comprising a second interface coupled to the first communications bus, the second interface containing circuitry to translate signals carried by the first communications bus in a third protocol into a fourth protocol, and a second communications bus coupled to the second interface, to carry signals to and from the second interface.

In yet another aspect, the present invention provides a computer comprising a processor, a memory coupled to the processor, a peripheral communications bus coupled to the processor, the peripheral communications bus permitting the processor to exchange information with peripherals attached to the peripheral communications bus, an integrated peripheral coupled to the peripheral communications bus, the integrated peripheral comprising a first pre-existing design comprising a functional unit to perform the function of the integrated peripheral, a first interface coupled to the integrated peripheral, the first interface containing circuitry to translate signals produced by the integrated peripheral in a first protocol into a second protocol, the integrated peripheral further comprising a first communications bus coupled to the first pre-existing design, the first communications bus to carry signals to and from the first pre-existing design, and a second pre-existing design coupled to the first communications bus, the second pre-existing design comprising a second interface coupled to the first communications bus and the peripheral communications bus, the second interface containing circuitry to translate signals carried by the first communications bus in a third protocol that is compatible with the peripheral communications bus.

In summary, a preferred embodiment of the present invention simplifies the designing, testing, and debugging of an integrated computer peripheral by using an existing design for the computer peripheral along with an existing communications bus interface rather than needing to develop a custom design for the computer peripheral and interface. The existing designs can be integrated seamlessly into an integrated circuit, whose function would be transparent to the computer to which it is attached.

The present invention provides a number of advantages. For example, use of a preferred embodiment of the present invention permits the rapid integration of devices and peripherals into an integrated circuit through the combination of existing peripherals and interfaces rather than creating a custom integrated circuit with a custom interface from scratch. Through the use of existing circuits and interfaces, the design, testing, and debugging time is greatly reduced, hence reducing the cost of the integrated circuit.

Also, use of a preferred embodiment of the present invention, through its use of existing (and tested) designs for peripherals and interfaces leads to the creation of integrated circuits with fewer errors than an integrated circuit that was custom designed. Helping to bring the integrated circuit to market more rapidly and reducing the chance of a faulty design being released to market.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the invention.

The following discussion focuses on a particular type of computer peripheral that makes use of a wireless communications network that is adherent to the Bluetooth technical standards. The Bluetooth technical standard specifies a short-range wireless communications network whose intended purpose is a low-power and low-cost replacement for physical cabling. The Bluetooth technical standard is specified in a document entitled "Specifications of the Bluetooth System, Version 1.1, Feb. 22, 2001," which is incorporated herein by reference. Additionally, the computer peripheral is said to make use of the Universal Serial Bus technical (USB) and Peripheral Component Interconnect (PCI) standards. The USB technical standard is specified in a document entitled "Universal Serial Bus Specifications, Revision 2.0, Apr. 27, 2000," which is incorporated herein by reference, while the PCI technical standard is specified in a document entitled "PCI Local Bus Specifications, Revision 2.2, Jun. 8, 1998," which is also incorporated herein by reference.

While the discussion focuses on these three above listed technical standards, the present invention is operable with other technical standards. For example, rather than USB or USB 2.0, the present invention is also operable with Institute of Electrical and Electronics Engineers (IEEE) 1394 (FireWire), Ethernet, and serial and parallel communications ports, peripheral components interconnect (PCI), PCI-X, and PCI-Express to list a few. In place of Bluetooth, the present invention is compatible with other wireless standards, such as cellular (TDMA, GSM, CDMA, 3G), HomeRF, IEEE 802.11 (Wi-Fi) and others. Additionally, the discussion focuses on network adapters, but the present invention can apply to other peripherals such as solid-state memory devices (Memory Stick, Smart Media, MultiMedia Card, Secure Digital), a generic memory bus, a bridge, a video bus, an audio bus, Cardbus, Smart Cards, modems, etc. Essentially, the present invention has application to practically any type of peripheral that may be connected to a computer.

Figure 1A:
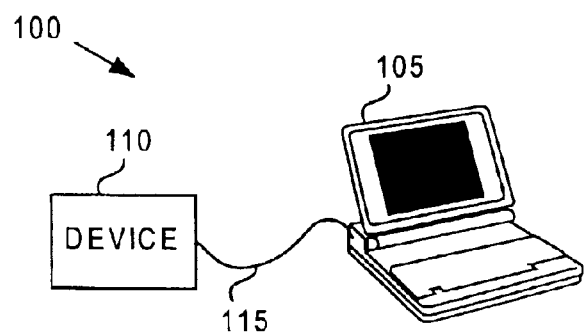
FIGS. 1a and 1b illustrate a block view and a functional view of a peripheral (or device) connected to computer via a communications bus.

Referring now to FIG. 1a, the diagram illustrates a computer 105 and a peripheral 110 attached to one another via a cable 115. Depending on the functionality of the peripheral 110, the peripheral 110 may sometimes be referred to as a device. Although displayed as being attached to the computer 105 by the cable 115, the peripheral 110 may be attached to the computer 105 by a wireless connection, be contained inside a slot in the computer 105 or be directly coupled to the computer 105 via a port, such as through a laptop computer's PCCard port or some other proprietary port. The diagram illustrates how peripherals can be attached to the computer 105 to enhance the computer's functionality and usability. The peripheral 110 being attached to the computer 105 may be one of a wide variety of devices, including but not limited to keyboards (wireless and wired), modems, network adapters, multimedia devices, security devices, sensors, etc.

Figure 1B:
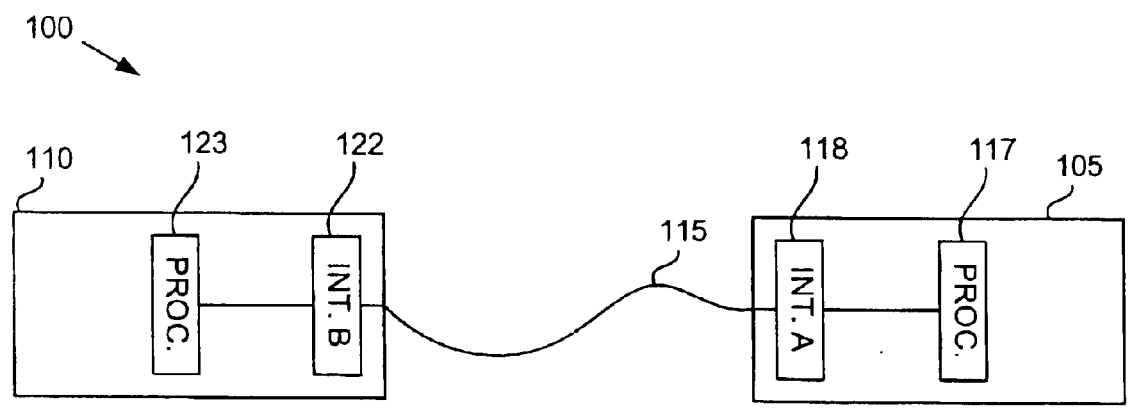

Referring now to FIG. 1b, the diagram illustrates an alternate view of the computer 105 and the peripheral 110 attached to each other via the cable 115. The diagram displays functional blocks within the computer 105 and the peripheral 110 that provide support for the attachment and use of the peripheral 110 with the computer 105. Within the computer 105, there is typically a processor (or processing element) 117. The processor 117 provides the computational power behind the computer 105. The processor 117 is normally connected to devices inside the computer 105 via a high-speed computer bus, such as a PCI bus (not labeled). In order for peripherals or devices such as the peripheral 110 to be attached to and be used by the computer 105, a communications bus must also be a part of the computer 105. For example, the USB is a communications bus that is available on most computers today. In FIG. 1b, the cable 115 may represent a USB cable connecting the peripheral 110 to the computer 105.

The communications bus permits the computer 105 and the peripheral 110 to communicate and exchange data. Other communications buses may include IEEE 1394 (FireWire), Small Computer Systems Interface (SCSI), serial and parallel ports, etc. Since the communications bus typically uses a different signaling protocol than the PCI bus, an interface 118 is required to perform the translation between the signaling protocols used by the communications and the PCI buses. The translation performed by the interface 118 may be done by software, hardware, or a combination of both.

For example, the translation may be as simple as converting a serial bit stream into a parallel bit stream or simply shifting signal voltage levels or as complex as decoding the data and then encoding the data differently to meet the requirements of the two busses.

The peripheral 110 also has an interface 122 that performs the needed translations between the signaling protocols used by the communications bus and a processor 123, located inside the peripheral 110. In many cases, the processor 123 will be a micro-controller, although in some cases, a full-fledged microprocessor may be required, depending upon the computational needs of the peripheral 110. In addition to providing any needed protocol translations between the communications bus and the processor 123, the interface 122 may perform interfacing functions for other signaling protocol incompatibilities. For example, if the peripheral 110 is a network interface card, then the peripheral 110 would have an interface to translate between the network communications protocol and the protocol of the communications bus.

When the use of a certain peripheral becomes widespread and if it is possible to integrate the peripheral into the computer, it becomes common practice to integrate the peripheral into the computer. For example, it is common to find standard wired network adapters built into a significant number of computers and wireless network adapters can be found in some computers, especially portable computers. In many cases, these peripherals are not being integrated into an integrated circuit (IC), rather, existing circuits are simply being placed onto the motherboard of the computer. The peripherals are simply being incorporated into the computers and not integrated into an IC. This may be because integrating the peripheral into an IC normally incurs a large expenditure of money and time. However, integrating the peripheral into an IC would result in a less expensive computer that uses less power and is more reliable overall. A significant percentage of the integration cost arises from the creation of device models for the integrated peripheral, the creation of a custom interface for the peripheral and the computer bus of the computer, and the testing and debugging of the custom designs. Any reduction in the amount of custom design work would result in a reduction in the cost of the integrated peripheral.

Figure 2:
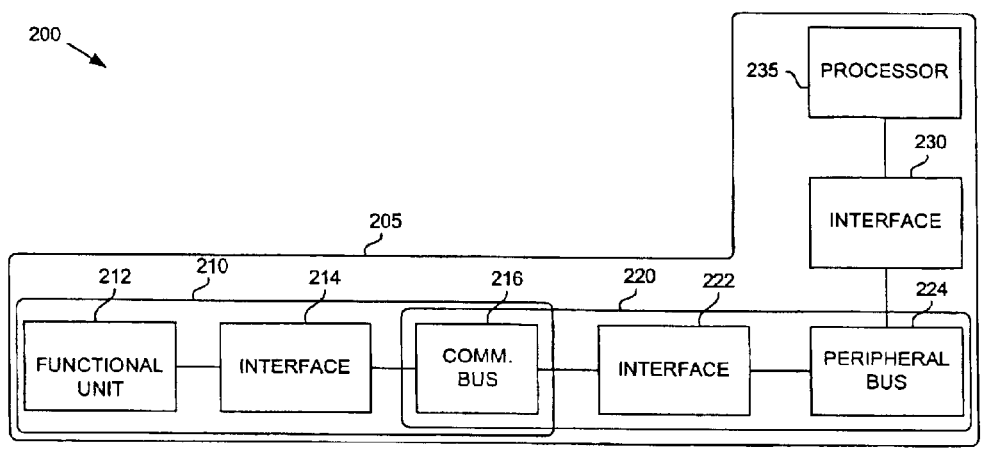
FIG. 2 illustrates a computer with a device that has been integrated into the computer.

Referring now to FIG. 2, the diagram presents a functional view of a computer 205 with a peripheral 210 incorporated therein. FIG. 2 provides a functional block diagram of the computer 205 that has incorporated into it the peripheral 210. The peripheral 210 may be a single integrated circuit or a set of integrated circuits with attendant glue logic. The peripheral 210 may be functionally divided into a functional unit 212, an interface 214, and a communications bus 216 that it uses to communicate with the computer 205. The functional unit 212 may be thought of as the part of the peripheral 210 that actually performs the peripheral's functions.

The computer 205 interacts with the peripheral 210 through a peripheral bus interface 220 that provides interface functionality between the peripheral 210 and a peripheral bus 224 via an interface 222 and the communications bus 216. The peripheral bus interface 220 provides an interface between the computer's peripheral bus and the communications bus 216. Although the computer's peripheral bus 224 is displayed as being contained within the peripheral bus interface 220, there may be more than one communications bus within a computer, therefore there may be more than one peripheral bus interface. Typically, there will be one peripheral bus interface per communications bus type in a computer. Since both the peripheral 210 and the peripheral bus interface 220 connect to the communications bus 216, the communications bus 216 can logically and functionally reside within both.

Communications from the peripheral's functional unit 212 to a computer's processor 235 is first converted into the signaling protocol of the communications bus 216 by the interface 214 and is then transmitted via the communications bus 216 to the peripheral bus 224 of the computer 205. The communications would likely require another conversion by the interface 222 to make it compatible with the signaling protocol of the peripheral bus 224. Once on the peripheral bus 224, the communications is ready to be delivered to the processor 235, after being converted into a signaling protocol that is understood by the processor 235 by a third interface 230. A similar, but reversed path is followed by communications from the processor 235 to the peripheral's functional unit 212.

Close examination of the diagram illustrated in FIG. 2 may lead to the conclusion that it is possible to integrate the peripheral bus interface 220 and the peripheral 210 into a single integrated circuit. This is because the communications bus 216 is shared by both the peripheral 210 and the peripheral bus interface 220. Due to the commonality between the two, it is possible to combine the functionality of the two circuits into a single integrated circuit.

Figure 3:
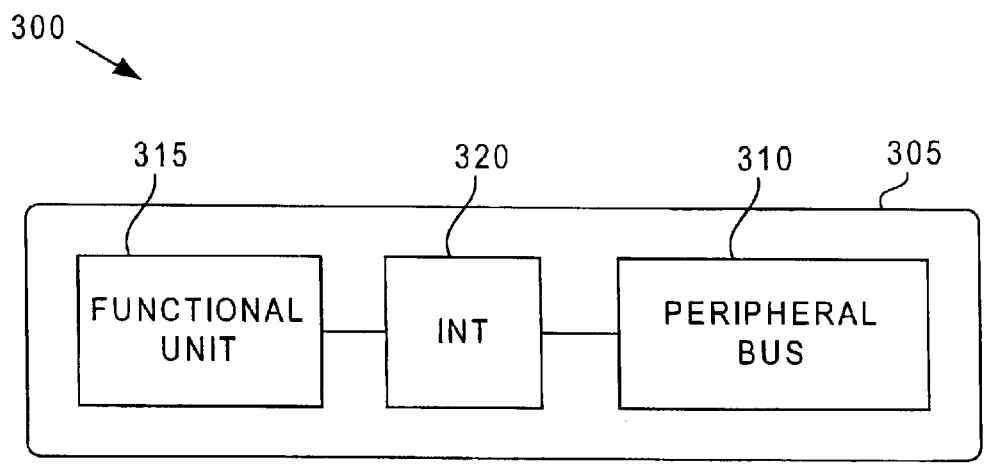
FIG. 3 illustrates the integration of a device into an integrated circuit.

Referring now to FIG. 3; the block diagram illustrates an integrated circuit 300 that integrates a peripheral bus interface and a peripheral into a single IC. Note that although the functionality of the IC 300 is the same as the peripheral 210 and the peripheral bus interface 220 (FIG. 2), the overall functional block diagram is simpler in appearance, due to the combination of the two interfaces (214 and 222) and the communications bus 216 into a single block, an interface block 320. The IC 300 includes a peripheral bus 310 and a functional unit 315 that is coupled together via the interface 320. Because the IC 300 is a custom design, a communications bus (such as the communications bus 216 (FIG. 2)) and its interfaces may be eliminated from the design. The communications bus and the interfaces (for example the communications bus 216 and the two interfaces 214 and 222) are replaced by the single interface 320 that performs an equivalent job. This is an advantage of a custom design, wherein any redundancies and unneeded circuitry can be eliminated to produce a smaller integrated circuit that uses less power. The net result is that the IC 300 can be simply connected to the peripheral bus of a computer.

As shown in FIG. 3, the typical approach to integrating a device into a computer is to create a custom interface between the device and the peripheral bus of the computer, along with a custom implementation of the peripheral itself. However, the use of custom designs can greatly increase costs and development time. It may be simpler to design an integrated circuit that simply took two (or more) well-tested circuits and integrated them together onto a single IC. This approach, while possibly more inefficient in terms of integrated circuit size and energy consumption, can produce an IC with minimal testing, debugging, and development time.

Figure 4:
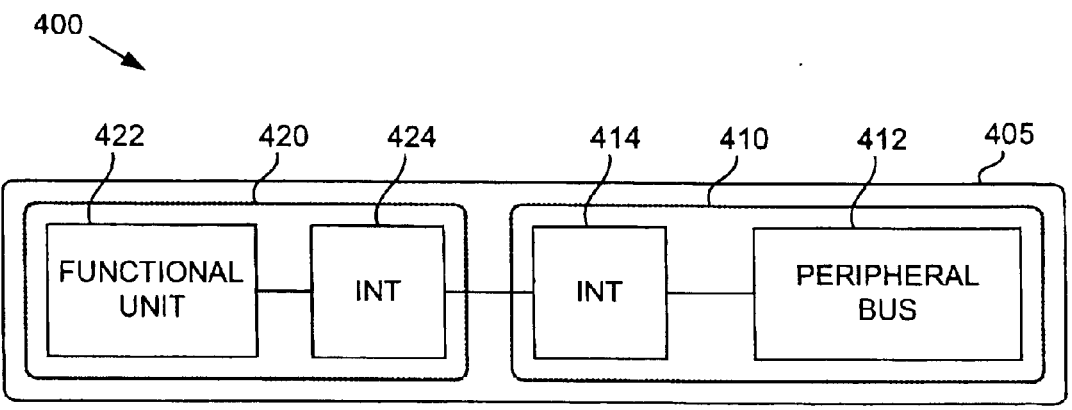
FIG. 4 illustrates the integration of a device into an integrated circuit using existing designs for the device according to a preferred embodiment of the present invention.

Referring now to FIG. 4, the block diagram illustrates an integrated circuit 405 created by integrating two circuits with pre-existing designs, a peripheral bus interface 410 and a device 420 according to a preferred embodiment of the present invention. The integrated circuit 405 may be thought of as a combination of the peripheral bus interface 410 and the device 420, together, on an integrated circuit. Both the peripheral bus interface 410 and the device 420 can be standard, off-the-shelf designs and are simply integrated onto a substrate. The integrated circuit 405 may be created simply by taking the designs for the peripheral bus interface 410 and the device 420, combined with a small amount of control and glue logic (neither shown), and fabricating the integrated circuit 405. An advantage of using standard designs is that they have already been well tested and are known to function properly.

The peripheral bus interface 410 contains a peripheral bus 412 and an interface 414 that can be identical to those in the peripheral bus interface 220 (FIG. 2), while the device 420 contains a functional unit 422 and an interface 424 that can also be identical to those in the device 210 (FIG. 2). According to a preferred embodiment of the present invention, the circuits are identical in design to their non-integrated counterparts, so that very little to no modification needs to be performed.

Figure 5:
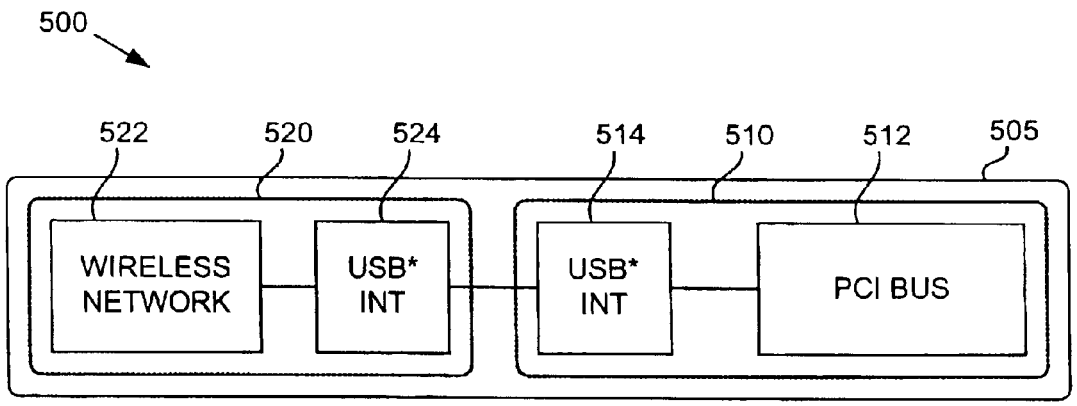
FIG. 5 illustrates an exemplary integrated circuit with a wireless network adapter and communications bus according to a preferred embodiment of the present invention.

Referring now to FIG. 5, the block diagram illustrates an exemplary integrated circuit 505, which integrates a wireless network adapter 520 with a PCI bus interface 510 according to a preferred embodiment of the present invention. The integrated circuit 505 includes PCI bus interface 510 that in turn includes a PCI bus interface functional unit 512 that allows the integrated circuit 505 the ability to communicate to devices on the PCI bus, a USB* interface 514 that is used to convert PCI bus communications into USB communications. The integrated circuit 505 also includes the wireless network adapter 520 that includes a wireless network functional block 522 that permits connectivity to communications and computer networks using a wireless communications protocol, such as Bluetooth or IEEE 802.11, and a USB* interface 524 that converts wireless network communications into USB communications.

Notice that the two USB* interfaces 514 and 524 are labeled "USB*" rather than "USB" since according to a preferred embodiment of the present invention, the USB* interfaces 514 and 524 do not actually convert the bit-parallel communications into a bit-serial form for transmission across the USB. Rather, the communications is kept in bit-parallel form. This is possible because no other devices will be connecting to the same USB communications bus, hence no confusion would occur. To accomplish the communications, the standard USB interfaces are modified so that the parallel-to-serial (and subsequent serial-to-parallel) conversions do not take place.

Figure 6:
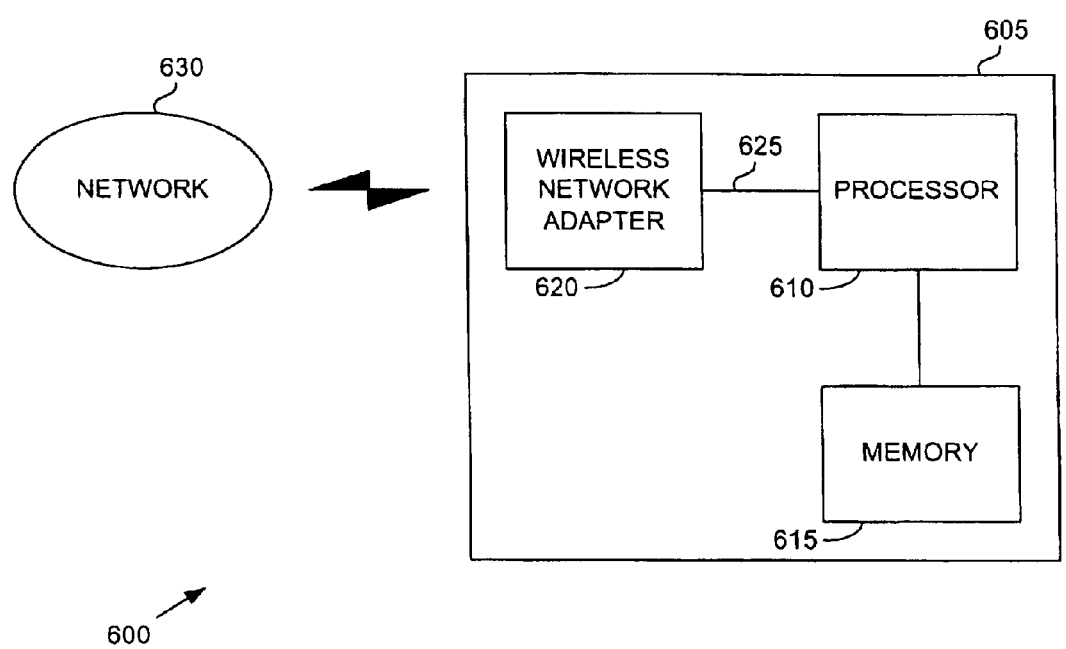
FIG. 6 illustrates an exemplary computer with an integrated wireless network adapter that permits the computer to wirelessly connect to a network.

Referring now to FIG. 6, the block diagram illustrates a computer 605 with an integrated wireless network adapter 620 according to a preferred embodiment of the present invention. The computer 605 features a processor 610 and a memory 615. Coupled to the processor 610 via a communications bus 615, for example, a peripheral communications bus, is the wireless network adapter 620. As discussed earlier, the wireless network adapter 620 may be an integrated circuit or a group of integrated circuits resident on the same circuit board as the processor 610. Alternatively, the wireless network adapter 620 may be on a separate circuit board that plugs into a slot that is in turn coupled to the communications bus 615. The wireless network adapter 620 allows the computer 610 to communicate to an external network 630 wirelessly.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for integrating a peripheral into a single integrated circuit comprising:

selecting a first existing design for the peripheral with a first interface coupled to a first communications bus;

selecting a second existing design coupled to a second communications bus and having a second interface coupled to a computer communications bus;

coupling the first and second existing designs together by coupling the first communications bus to the second communications bus; and integrating the first and second existing designs into the single integrated circuit;

wherein the first and second communications buses are serial communications buses and wherein the first and second interfaces are modified to support bit-parallel communications.

2. The method of claim 1, wherein the first and second communications buses are International Electrical and Electronics Engineers (IEEE) 1394 compliant buses.

3. The method of claim 1, wherein the first and second communications buses are Small Computer System Interface (SCSI) compliant buses.

4. The method of claim 1, wherein the first existing design is an existing design for the peripheral, previously created and tested.

5. The method of claim 1, wherein the second existing design is an existing design for a communications bus interface to a computer previously created and tested.

6. The method of claim 1, wherein the first and second communication buses are PCI Express compliant.

7. A method for integrating a peripheral into integrated circuit comprising:

selecting a first existing design for the peripheral with a first interface to a first communications bus;

selecting a second existing design with a second communications bus with a second interface to a computer communications bus;

coupling the first and second existing designs together; and integrating the first and second existing designs into the integrated circuit;

wherein the first and second communications buses are Universal Serial Bus (USB) compliant buses; and wherein the first and second interfaces are modified to support bit-parallel communications.

8. A single integrated circuit comprising:

a first pre-existing design comprising:
  a peripheral;
  a first interface coupled to the peripheral, the first interface containing circuitry to translate signals produced by the peripheral in a first protocol into a second protocol;

a first communications bus coupled to the first pre-existing design, the first communications bus to carry signals to and from the first pre-existing design;

a second pre-existing design coupled to the first communications bus, the second pre-existing design comprising:
  a second interface coupled to the first communications bus, the second interface containing circuitry to translate signals carried by the first communications bus in the second protocol into a third protocol; and a second communications bus coupled to the second interface, to carry signals to and from the second interface; wherein the first communication bus is a set of electrically conductive lines coupled to the first and second interfaces; and wherein the first communications bus is a serial communications bus and signals are transmitted in a parallel fashion.

9. The integrated circuit of claim 8, wherein to the integrated peripheral appears to a device coupled to the second communications bus, to be connected by the first communications bus.

10. The integrated circuit of claim 8, wherein signals transported on the first communications bus are transported using a signaling protocol of the first communications bus.

11. The integrated circuit of claim 8, wherein the integrated circuit placed onto a circuit board inside the computer.

12. The integrated circuit of claim 8, wherein the first interface is coupled to the peripheral via a wireless communications link.

13. The integrated circuit of claim 12, wherein the wireless communications link is a Bluetooth communications link.

14. The integrated circuit of claim 8, wherein the first and second communications buses are PCI Express compliant.

15. An integrated circuit comprising:
   a first pre-existing design comprising:
      a peripheral;
      a first interface coupled to the peripheral, the first interface containing circuitry to translate signals produced by the peripheral in a first protocol into a second protocol;
   a first communications bus coupled to the first pre-existing design, the first communications bus to carry signals to and from the first pre-existing design;
   a second pre-existing design coupled to the first communications bus, the second pre-existing design comprising:
      a second interface coupled to the first communications bus, the second interface containing circuitry to translate signals carried by the first communications bus in the second protocol into a third protocol; and
      a second communications bus coupled to the second interface, to carry signals to and from the second interface;
   wherein the first communications bus is a set of electrically conductive lines, coupled to the first and second interfaces; and
   wherein the first communications bus is an Universal Serial Bus (USB) and signals are transmitted in a parallel fashion.

16. A computer comprising on a single chip:
   a processor;
   a memory coupled to the processor;
   a peripheral communications bus coupled to the processor, the peripheral communications bus permitting the processor to exchange information with peripherals attached to the peripheral communications bus;
   an integrated peripheral coupled to the peripheral communications bus, the integrated peripheral comprising on a single chip:
   a first pre-existing design comprising:
      a functional unit to perform the function of the integrated peripheral;
      a first interface coupled to the integrated peripheral, the first interface containing circuitry to translate signals produced by the integrated peripheral in a first protocol into a second protocol;
   a first communications bus coupled to the first pre-existing design, the first communications bus to carry signals to and from the first pre-existing design using the second protocol; and
   a second pre-existing design coupled to the first communications bus, the second pre-existing design comprising a second interface coupled to the first communications bus and the peripheral communications bus, the second interface containing circuitry to translate signals carried by the first communications bus to a third protocol that is compatible with the peripheral communications bus;
   wherein the first communications bus is a set of electrically conductive lines, coupled to the first and second interfaces; and
   wherein the first communications bus is a serial bus and signals are transmitted in a parallel fashion.

17. The computer of claim 16, wherein the integrated peripheral is an integrated circuit located on a common circuit board with the processor.

18. The computer of claim 16, wherein the integrated peripheral is an integrated circuit located on a first circuit board that is attached to a second circuit board that contains the processor.

19. The computer of claim 18, wherein the first circuit board is external to a housing containing the second circuit board, and wherein the first and second circuit boards are attached via a cable.

20. The computer of claim 16, wherein the first communications bus is PCI Express compliant.

21. The computer of claim 16, wherein the first communications bus is Universal Serial Bus (USB) compliant.

* * * * *